US005567322A

United States Patent [19]

Rundle et al.

[11] Patent Number: 5,567,322

[45] Date of Patent: Oct. 22, 1996

[54] WATER COOLER FILTRATION DEVICE

[76] Inventors: Christopher Rundle, 12598 SW. 60th Ct., Miami, Fla. 33156; Michael Borell, 7787 SW. 86th St., Apt. 310, Miami, Fla. 33143

[21] Appl. No.: 527,628

[22] Filed: Sep. 13, 1995

[51] Int. Cl.$^6$ .................... B01D 35/04

[52] U.S. Cl. .................... 210/455; 210/416.3; 210/467; 215/248; 222/146.6

[58] Field of Search .................... 215/231, 248, 215/308; 222/146.6, 188, 189.06, 189.09, 189.07; 210/172, 416.3, 455, 464, 466, 467

[56] References Cited

U.S. PATENT DOCUMENTS

| | | | |
|---|---|---|---|
| 2,153,981 | 4/1939 | Heineman | 215/248 |
| 2,191,447 | 2/1940 | Beardsley | 215/248 |
| 3,592,245 | 7/1971 | Scheller et al. | 215/308 |
| 3,782,549 | 1/1974 | Muller | 210/464 |
| 4,259,184 | 3/1981 | D'Arnal | 210/464 |
| 4,699,188 | 10/1987 | Baker et al. | 222/146.6 |
| 5,139,666 | 8/1992 | Charbonneau et al. | 210/416.3 |
| 5,273,083 | 12/1993 | Burrows . | |
| 5,295,519 | 3/1994 | Baker et al. | 222/146.6 |
| 5,297,700 | 3/1994 | Burrows et al. . | |
| 5,328,059 | 7/1994 | Campbell . | |
| 5,366,619 | 11/1994 | Matsui et al. . | |

*Primary Examiner*—W. L. Walker
*Attorney, Agent, or Firm*—McHale & Salvin, P.A.

[57] ABSTRACT

The instant invention is a disposable water cooler bottle filtration device. The filtration device is situated within the well of a conventional water cooler and employs an elongated tube with a centrally disposed piercing tip. The tip provides for the puncturing of the water bottle cap when the water bottle is placed thereon. Water flowing through the tube passes through a sub-micron filter capable of removing bacteria. Optionally activated carbon may be placed within the support structure providing removal of chlorine and known carcinogenic formed by chlorine combined by-products.

14 Claims, 1 Drawing Sheet

WATER COOLER FILTRATION DEVICE

FIELD OF THE INVENTION

The instant invention is related to water coolers and more particularly to a filtration device for use with conventional water coolers.

BACKGROUND OF THE INVENTION

Drinking water is a commodity that can no longer be taken for granted. Rain water typically provided the purest drinking water; however, pure water has the ability to dissolve most substances. Polluted air further results in aggressive water capable of dissolving more minerals, thereby leading to a hydrologic cycle that continues to produce excessively polluted water. As rain water falls it will pick up impurities including gases which may further increase its ability to dissolve other substances. As the water reaches the ground partly dissolves anything that it touches including rock providing the following constituents: gypsum-calcium sulfate, limestone-calcium carbonate, fluorspar-calcium fluoride, magnetite-iron or iron sulfide, magnetite-magnesium carbonate, and so forth. This water is collected and distributed as tap water to the masses for daily use including drinking purposes.

Health conscious consumers no longer trust tap water and seek treated water for purposes of consumption. The most recognized treated water container is the 5-gallon water bottle delivered to a home or office. Water bottles are used in combination with a water cooler mechanism providing chilled or heated water on demand. The water cooler positions the water container in an inverted position allowing water displacement by gravity.

According to data collected by the International Bottled Water Association (IBWA), the number of gallons of water flowing through water coolers doubled from two hundred seventy million in 1985 to more than four hundred sixty million in 1991 with estimates close to six hundred million by the year 1995. Part of the increase is no doubt due to the consumers concern about the safety of drinking tap water.

A problem with bottled water is that, even though the water may be more healthy than tap water, many water coolers harbor unhealthy, high levels of bacteria that can cause nausea and diarrhea. In the early 1990's researchers from Boston's Northeastern University checked the bacterial content of water from ten randomly selected water coolers and found in each case a bacteria level that reached at least two thousand potentially harmful organisms for every thousandth of a liter of water. In some water coolers, particularly those used frequently, counts exceeded one million harmful organisms. The researchers found little or no bacteria as a result of water delivery. It was uncovered that the organisms from each new bottle of water adhere to the cooler's reservoir or the well in which the bottle sits.

A number of devices are directed to address this problem. These devices are mainly directed to the use of sealed bottled water systems having filtered air input. The prior art devices do not address the hundreds of thousands of water coolers currently in the marketplace.

U.S. Pat. No. 5,273,083 discloses an improved water bottle cap and valve assembly which allows for the installation and removal of partially filled water bottles. The device provides for a sealable cap that is opened and closed upon placement into the water cooler well. The sealable cap is complex making it expensive to manufacture and requiring an associated valve member within the water cooler.

U.S. Pat. No. 5,328,059 discloses a bottled water system for use with water coolers. A piercing valve engages the top of a water bottle with a biasing valve in a closed position until piercing is accomplished. An external valve mechanism allows for insertion of treated air to prevent airborne bacteria from entering the water storage area. This invention is unique in that it addresses the need for air filtration but requires an expensive mechanism that requires a complex alteration or replacement of water coolers.

U.S. Pat. No. 5,297,700 sets forth a water cooler having a removable reservoir for ease of cleaning purpose. This teaching is most beneficial as it enhances a water cooler by providing access to the primary breeding ground for bacteria. However, this invention does not address existing water coolers and further utilizes a refrigeration system of limited coils making it difficult to efficiently cool a large quantity of water.

U.S. Pat. No. 5,366,619 discloses yet another water cooler directed to elimination of bacteria by injecting ozone into the water reservoir. Ozone, being a highly volatile oxygen derivative, requires precise control as a minute amount of ozone will be ineffective and over ozonization can be harmful upon ingestion.

Thus, what is lacking in the art is an inexpensive filtration device capable of treating existing water cooler devices for lessening the opportunity for bacteria growth within the storage container.

SUMMARY OF THE INVENTION

The instant invention is a disposable filtration device for placement within the well of conventional water coolers. The device includes a bottle cap piercing mechanism and media filtration for air and water. Filtration inhibits bacteria from entering the storage reservoir.

The device is defined by a circular shaped support structure sized to fit within the well of a water cooler, the structure having a centrally disposed tube capable of piercing the cap of a water bottle when a bottle is placed thereon. In this manner, the water bottle need not be modified or have the cap removed. The bottle is maintained in a bacteria free state by leaving the cap on the bottle. When the water cooler requires for bottle replacement a new bottle is simply inverted and placed over the piecing mechanism, the weight of the water filled bottle is sufficient to cause the insertion tube to puncture the cap allowing access to the water.

A sub-micron filter element capable of prohibiting bacteria passage is located in the lower portion of the support structure. The filter element operates as a barrier for airborne bacteria. When the water bottle is removed the filter inhibits bacteria from entering the storage reservoir.

The upper portion of the support structure, preferably the aperture area of the tube, may include activated carbon filtration media. Activated carbon is capable of removing various water contaminants that impart unpleasant tastes to water such as chlorine, trithalomethanes, fluoride, and other carcinogenic constituents. Such items may be found in water bottles filled from areas lacking proper post-treatment facilities. For instance, unbeknownst to the consumer, many water bottles are simply filled with water drawn from a municipal water supply and simply filtered to remove floating objects. In this manner a filter including activated carbon enhances the bottled water. In addition, the filter further allows an individual to use their own municipal water supply. The slow flow rate through the media is beneficial by allowing maximum contact with the activated carbon, having only gravity flow, thereby preventing dislodgment of the carbon passed at a high flow rate or under pressure.

In operation, the water bottle is removed and the storage reservoir disinfected by use of a common disinfectant, such as sodium hypochlorite, followed by placement of the filtration device into the well of the water cooler. The storage reservoir is then drained of the disinfectant. Air displacing the disinfectant is drawn through the filtration device with airborne bacteria estopped. The result is a storage reservoir that is free of bacteria with the air that displaced the disinfectant lacking bacteria influx thus providing a sanitized water cooler. A water bottle is then placed over the filtration device for insertion into the water cooler well, the cap of the water bottle is pierced allowing water to flow through the filtration device and into the storage reservoir.

If the water includes bacteria, the sub-micron filter is capable of stopping entrance into the storage reservoir. However, it is noted that over a period of time bacteria are capable of growing through the filter. For this reason, the device is made of a low cost material allowing for disposability.

One embodiment of the invention utilizes a piercing tube made of a smooth-contour shaped material wherein removal of an empty bottle allows the device to remain in position. This allows the device to be used repeatedly under certain conditions. Alternatively, the tube may frictionally engage the water bottle cap wherein removal of the water bottle further removes the filtration device. This allows for ease of disposal and further acts as a reminder for an individual to disinfect the storage container on a more frequent basis.

Thus, an objective of the instant invention is to provide an inexpensive, disposable filtration device for use with conventional water coolers to inhibit bacteria from entering the storage reservoir and provide a piercing mechanism to allow insertion of a water bottle without removal of the bottle cap.

Yet another objective of the instant invention is to teach the use of a sub-micron filter to prevent air and water borne bacteria from entering a sanitized storage reservoir.

Yet another objective of the instant invention is to provide for the use of activated carbon media for removal of chlorine and related by-product carcinogenic matters for conventional water coolers.

Other objectives and advantages of this invention will become apparent from the following description taken in conjunction with the accompanying drawings wherein are set forth by way of illustration and example, certain embodiments of this invention. The drawings constitute a part of the specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
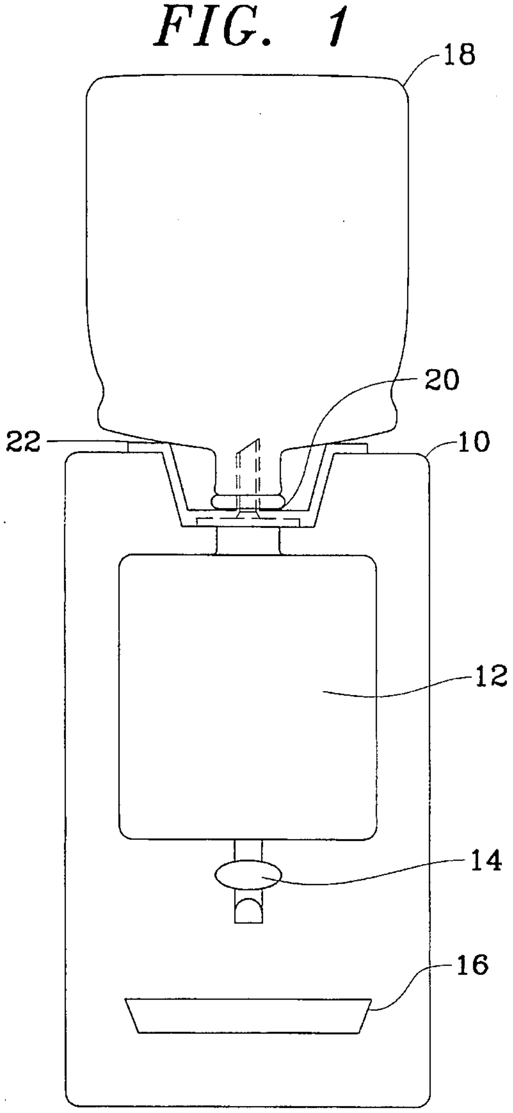
FIG. 1 is a pictorial view of a water cooler system having an inverted water bottle.

Now referring to FIG. 1, set forth is a conventional water cooler 10 having reservoir 12 fluidly coupled to spigot 14 providing a drain to the reservoir 12 used for drawing water. A tray 16 is positioned beneath the spigot 14 to catch excess water should a cup be improperly placed or prematurely removed from beneath the spigot. Water bottle 18 is placed over the water cooler 10 and into an inverted position allowing gravity feed into the reservoir 12. Water drawn from the reservoir 12 is replenished until all the water is drawn out of the spigot 14.

Replacement of the water bottle typically requires a cap located on the end 20 of the water bottle 18 to be removed before the bottle is inverted. As the bottle is inverted, it is not uncommon for water to spill over the water cooler further allowing airborne bacteria and other contaminants to enter the reservoir thereby creating a breeding ground for bacteria. The water bottle 18 fits within well 22 having a conical shaped area for proper positioning and support of the bottle 18. No attachments are necessary, for the weight of the water filled bottle maintains the bottle in position. When the bottle is depleted it is removed wherein a new water bottle is substituted by first removing the bottle cap before placing the bottle on the well 22 for use in filling the reservoir 12.

Figure 2:
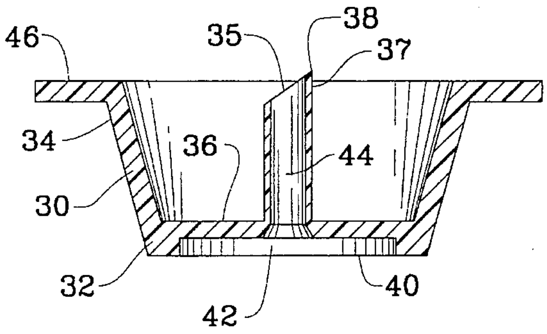
FIG. 2 is a cross-sectional side view of the instant invention.

Referring to FIG. 2, set forth is the instant invention which consists of a support structure 30 having a circular base 32 having a substantially flat wall with a tapered side wall sealingly coupled to a continuous side wall 34 coupled to the base and capable of insertion into a well of a conventional water cooler. Support structure 30 is constructed from a single piece of rigid material, preferably plastic with a centrally disposed tube 37 positioned in the middle of base 32. Tube 37 has a side wall of nominal thickness forming an aperture 35 with a chamfer end 38 capable of piercing the plastic end caps on conventional water bottles. Aperture 35 fluidly communicates the end 38 through the tube to cavity 40 used for housing a sub-micron filter 42.

Activated carbon 44 may also be placed within the aperture 35 wherein water entering the aperture percolates past the activated carbon 44 for removal of chlorine, trihalomethanes, polychlorinated and related chlorine compound items. Filter 42 operates to maintain the activated carbon in position as well as prevent particles from flowing through and into the reservoir. A screen or filter element may also be placed along the upper portion of the aperture to prevent a backflow of carbon into the water bottle.

Figure 3:
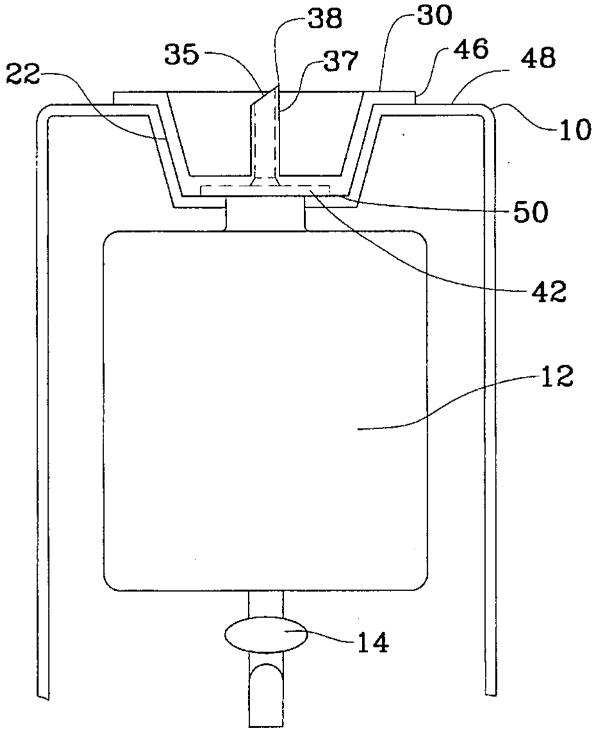
FIG. 3 is a partial cross-sectional side view of the aforementioned water cooler with the instant invention positioned within the water cooler well.

As shown in FIG. 3, the water cooler 10 has the support structure 30 placed within well 22 wherein tube 37, having chamfered end 38, is available for piercing a water bottle cap placed over the tube 37 allowing water to flow through aperture 35 into storage reservoir 12 for subsequent dispersion through spigot 14. A perimeter rim 46 of the support structure 30 frictionally engages an upper surface 48 of the water cooler 10 providing a seal around the chamber so as to inhibit air flow. A gasket may be used to further enhance the sealing effect of the device. The perimeter rim 46 further provides a gripping surface to allow an individual to hold the support structure 30 in position when a water bottle is removed or to be used more than once. The lower surface 50 of the device 30 may be used to position a sealable O-ring or the like gasket material providing a sealing for the reservoir.

In operation, reservoir 12 is filled with chlorinated tap water to destroy bacteria. The device 30 is then placed into well 22 wherein spigot 14 is open and the water in the reservoir drained through the spigot providing proper sterilization of both the reservoir and spigot. With the device 30 in position, air drawn through aperture 36 passes filter 42 providing bacteria free air for displacement of the water held in reservoir 12. A water bottle may then be placed over the tube 37, with the cap in position, wherein the chamfered tip 38 is available for piercing the end of the cap, thereby placing a portion of the tube 37 into the neck of a water bottle. Water flows through aperture 36 past filter 42 for filling of reservoir 12. As water is removed from spigot 14 air flows back through aperture 36 for displacement into the water bottle situated thereon. As previously mentioned, the tube 37 may contain activated carbon for removal of chlorinated substances improving the taste and color of the water.

It is to be understood that while we have illustrated and described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A filtration device for placement in a water cooler well comprising: a support structure having a base shaped to fit within a water cooler well formed by a substantially flat wall with a tapered side wall sealingly coupled to said base; a tube means centrally located in said support base having a first end sealingly coupled to said base and a second end projecting upwardly from said base forming an aperture therebetween, said second end having a chamfered leading edge with an opening to said aperture, said tube means piercing the cap of an inverted filled water bottle wherein water flows through said aperture of said tube means; a filter receiving cavity within said support structure positioned in fluid communication with said tube means aperture; and a filter means receivably secured within said cavity to said base, said filter means fluidly communicating with said tube means thereby providing for the filtration of water or air entering the water cooler through said aperture.

2. The filtration device according to claim 1 including a means for securing said support structure to a water cooler, thereby sealing said structure to a storage reservoir permitting aspiration only through said tube.

3. The filtration device according to claim 1, wherein said side wall is conically shaped having a first diameter adjacent said base less than a second diameter formed along an upper edge of said side wall, said side wall defining a circular shape when viewed normal to said base.

4. The filtration device according to claim 3, wherein said means for sealing includes a gasket formed along a lower surface of said base.

5. The filtration device according to claim 3, wherein said seal is defined as gasket formed along a lower surface of a peripheral lip located along an upper edge of said side wall.

6. The filtration device according to claim 1 wherein said filter means is a sub-micron filter positioned in said receiving cavity within said base.

7. The filtration device according to claim 1 including a peripheral lip extending outwardly along an upper edge of said side wall.

8. The filtration device according to claim 1, wherein said filtration means includes activated carbon within said apertured tube means.

9. The filtration device recited in claim 1 wherein said support structure is constructed from plastic.

10. A filtration device for placement in a water cooler well comprising: a one piece plastic support structure having a base shaped to fit within a water cooler well formed by a substantially flat bottom wall sealingly coupled to a conically shaped side wall having a first diameter adjacent said base less than a second diameter formed along an upper edge of said side wall; a tube centrally located and projecting upwardly from said support base having a first end sealingly coupled to said base and a chamfered second end forming a piercing tip with an aperture therebetween, said tube piercing the cap of an inverted filled water bottle wherein water flows through said aperture of said tube; a sub-micron filter secured within said base and fluidly communicated with said aperture of said tube; means for securing said filtration device to a water cooler; wherein water flows through said aperture of said tube and through said filter providing for the filtration of water or air entering the water cooler through said aperture.

11. The filtration device according to claim 10, includes a gasket placed along a lower surface of said base for sealing said device to a storage reservoir in the water cooler.

12. The filtration device according to claim 10, wherein seal is defined as a gasket formed along a lower surface of a peripheral lip located along an upper edge of said side wall.

13. The filtration device according to claim 10 including a peripheral lip extending outwardly along an upper edge of said side wall.

14. The filtration device according to claim 10, wherein said filtration device further includes activated carbon within said apertured tube.

* * * * *